United States Patent [19]

Lazzarotti et al.

[11] 4,307,293

[45] Dec. 22, 1981

[54] OPTICAL READER KIT FOR LETTER SORTING MACHINES

[75] Inventors: Sebastian J. Lazzarotti, Broomall; Paul E. Tartar, Chester, both of Pa.

[73] Assignee: Burroughs Corporation, Detroit, Mich.

[21] Appl. No.: 175,148

[22] Filed: Aug. 4, 1980

[51] Int. Cl.[3] ........................ G06K 7/00; G06K 19/08

[52] U.S. Cl. .................................... 235/462; 209/584

[58] Field of Search .............................. 235/462, 375; 340/146.3 H; 209/3.2, 584, 610, 629, 569

[56] References Cited

U.S. PATENT DOCUMENTS

| | | | |
|---|---|---|---|
| 3,108,694 | 10/1963 | Crain et al. | 209/569 |
| 3,368,672 | 2/1968 | Heaney et al. | 209/569 |
| 4,117,975 | 10/1978 | Gunn | 235/375 |
| 4,247,008 | 1/1981 | Dobbs | 209/584 |

*Primary Examiner*—Donald J. Yusko

*Attorney, Agent, or Firm*—Francis A. Varallo; David G. Rasmussen; Kevin R. Peterson

[57] ABSTRACT

An optical reader system configured as a kit for retrofitting the input consoles of existing letter sorting machines of the type used by the U.S. Postal Service. Such machines require that an operator, stationed at a console, enter sorting information for each mail piece, by way of a manually actuated keyboard. The present invention expands the processing capabilities of the machines by permitting the machine reading of mail pieces that have had their address information precoded in machine readable form on their respective faces. At the same time, the automatic function does not impair or modify the usual operator controlled console operation when non-coded mail is being processed.

10 Claims, 4 Drawing Figures

OPTICAL READER KIT FOR LETTER SORTING MACHINES

BACKGROUND OF THE INVENTION

The U.S. Postal Service has approximately 800 multiple-position letter sorting machines, MPLSM's, such as the Series Nos. 120 and 140, in use in postal facilities throughout the United States. Each sorting machine includes 12 operator-manned coding consoles which serve as input devices for the delivery of mail into the MPLSM for the sortation and distribution thereof to any of 277 destination receptacles. Each letter must pass before an operator who reads the address and enters certain address information into the machine via a keyboard while the mail piece is automatically deposited in a letter-conveying cart compartment. The cart and the address data in memory are then instrumental in the delivery of the mail piece to its designated receptacle.

It has been observed that the flexibility and utility of letter sorting machines might be extended if they could be provided with the ability to automatically machine-read mail pieces that have had their address information pre-coded in machine readable form on the face of the mail pieces. Under these conditions, the consoles would not require the services of operators. Rather the consoles would merely serve as document handling input devices having an automatic read capability. However, this automation would only be beneficial if it did not impair or modify existing operator-controlled console operation when the processing entails non-coded letter mail.

The present invention meets the foregoing criteria in providing for the conversion of the MPLSM's to increase their processing capabilities.

SUMMARY OF THE INVENTION

In accordance with the present invention, a letter sorting machine of improved utility and flexibility is provided. Basically, this is achieved through the incorporation of an optical read station into the input console of the machine and the provision of an electrical interface to permit the machine to accept either the manually-inputted keyboard information or the information derived from the optical reader.

Structurally, the optical read station is conveniently located on the input console adjacent the normal viewing area associated with the operator keyboard entry. The mail piece is advanced past the viewing area and is conveyed through the read station.

Electrically, the current letter sorting machine utilizes a device known as a "ZIP Mail Translator", in conjunction with an "Electronic Sort Processor" to automatically direct mail to its proper bin designation. The present invention provides an electrical interface, designated hereinafter as a "ZIP Data Input Interface" which accepts either the manual keyboard data or the data originating in the optical reader, and through the application of circuit logic provides output data in the format utilized by the manual keyboard. In this way, no modification of the "ZIP Mail Translator" portion of the machine is required to shift from manual to automatic operation, or vice versa.

The present invention comprises, in effect, a retrofitable optical reader kit for use on the input consoles of letter sorting machines. A number of advantages accrue to the letter sorting operation through the application of the invention. For example, the fully automatic sorting of pre-coded mail may be accomplished using modified existing equipment as opposed to requiring entirely new automatic sort system equipment. Moreover, the present invention extends the automatic sortation capability to smaller postal facilities, whose automatic reading needs are too small to justify installation of fully automatic high speed systems but nevertheless have a need for an automatic read capability. Also, it has been found that the present approach minimizes investment and operating costs when compared to those of fully automatic high speed input equipment for letter sorting machines, which are inherently more expensive and more sensitive in their ability to operate at peak efficiency for substantial periods.

As mentioned hereinbefore, the multiple-position letter sorting machine includes 12 operator-manned input consoles. In utilizing the invention, any desired number of the consoles may at any time be programmed to serve as automatic read stations. This arrangement permits selection of a desired number of consoles to be used for automatic reading stations in combination with the remaining operator-attended consoles for entry of non-coded address information. In this manner, the letter sorting machine can be tailored to simultaneously sort both types of mail, and in any desired proportion.

In connection with operating efficiency, the downtime of a single console minimizes the effect on system throughput, for example, one letter per second per 12 input consoles, when compared to downtime of more sophisticated input equipment which may operate in the order of 6 letters per second per two input stations.

Other features and advantages of the optical reader system of the present invention will become apparent in the detailed description which follows.

DESCRIPTION OF THE PREFERRED EMBODIMENT

Figure 1:
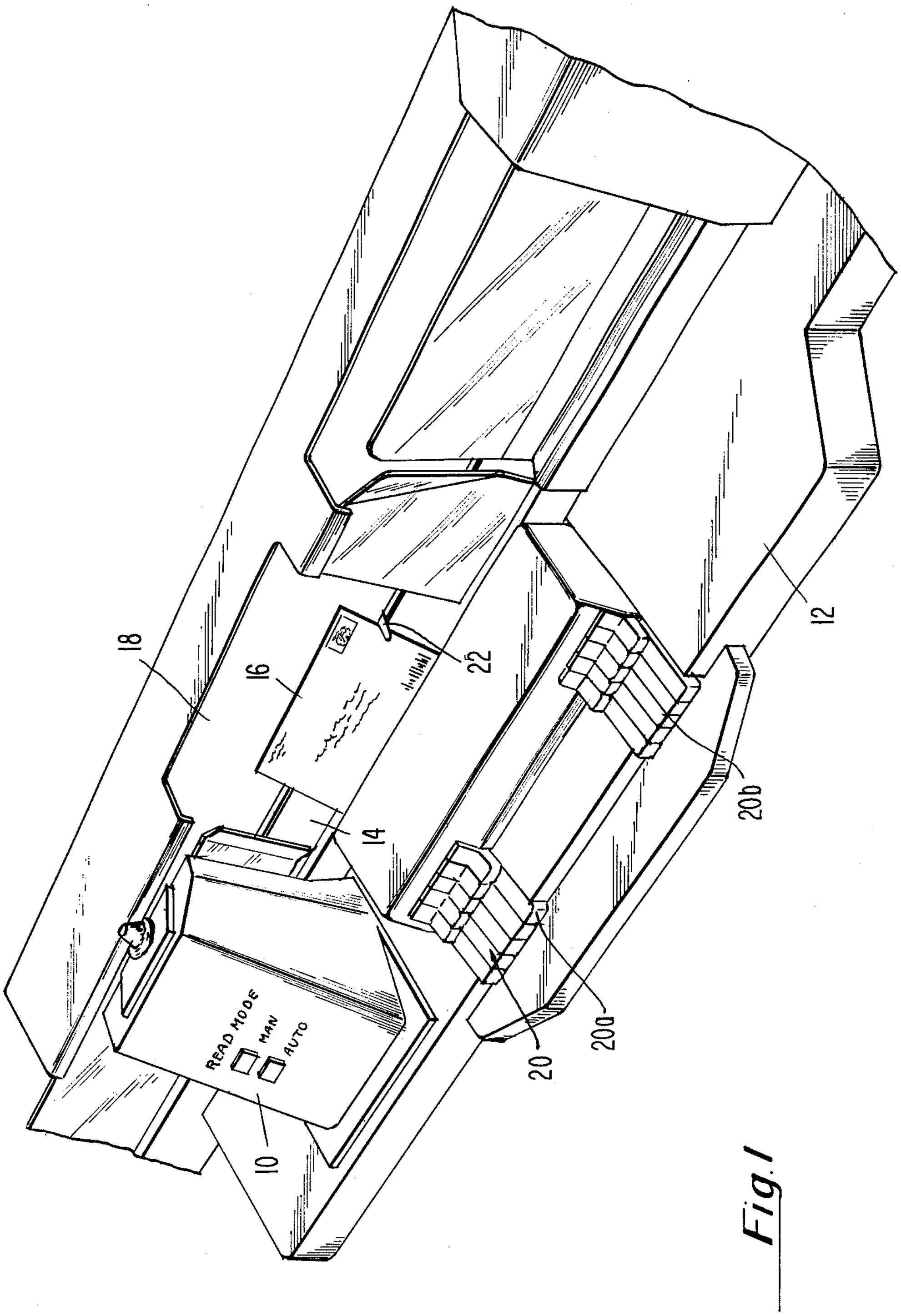
FIG. 1 is a pictorial view of the input console of a present day letter sorting machine modified to include an optical reader station as contemplated by the present invention.

FIG. 1 illustrates the physical relationship of an optical code reader 10 to the existing elements of the input console 12 of the LSM.

To implement the automated mode, conventional transport rollers (not shown), driven from existing power sources within the console, and associated spring-loaded pinch rollers (not shown) are combined with elevation adjustments in the letter trough 14 to insure that the document 16 is front face registered against the reader platen within the read station 10, as it is transported therethrough . Briefly, in operation, a letter 16 is delivered by transport means (not shown) to the viewing area 18 where it is momentarily at rest and may be examined by an operator, who then enters its destination into the console 12 via keyboard 20. Subsequently, a pusher finger 22 actuated by a second transport means (not shown) engages and accelerates the trailing edge of the letter. In the absence of the read station 10, the last mentioned transport means would continue to move the letter along its normal conveyance path. However, with the addition of the optical read station, the aforementioned rollers engage the mail piece and move it at a substantially uniform velocity corresponding to that of the pusher finger 22. It is apparent that the finger continues to move along with the letter 16 but is relieved of its document pushing function. As the document leaves the read station transport rollers, the conveying of the mail piece along its usual path in the console is again resumed by the pusher finger 22.

Figure 2:
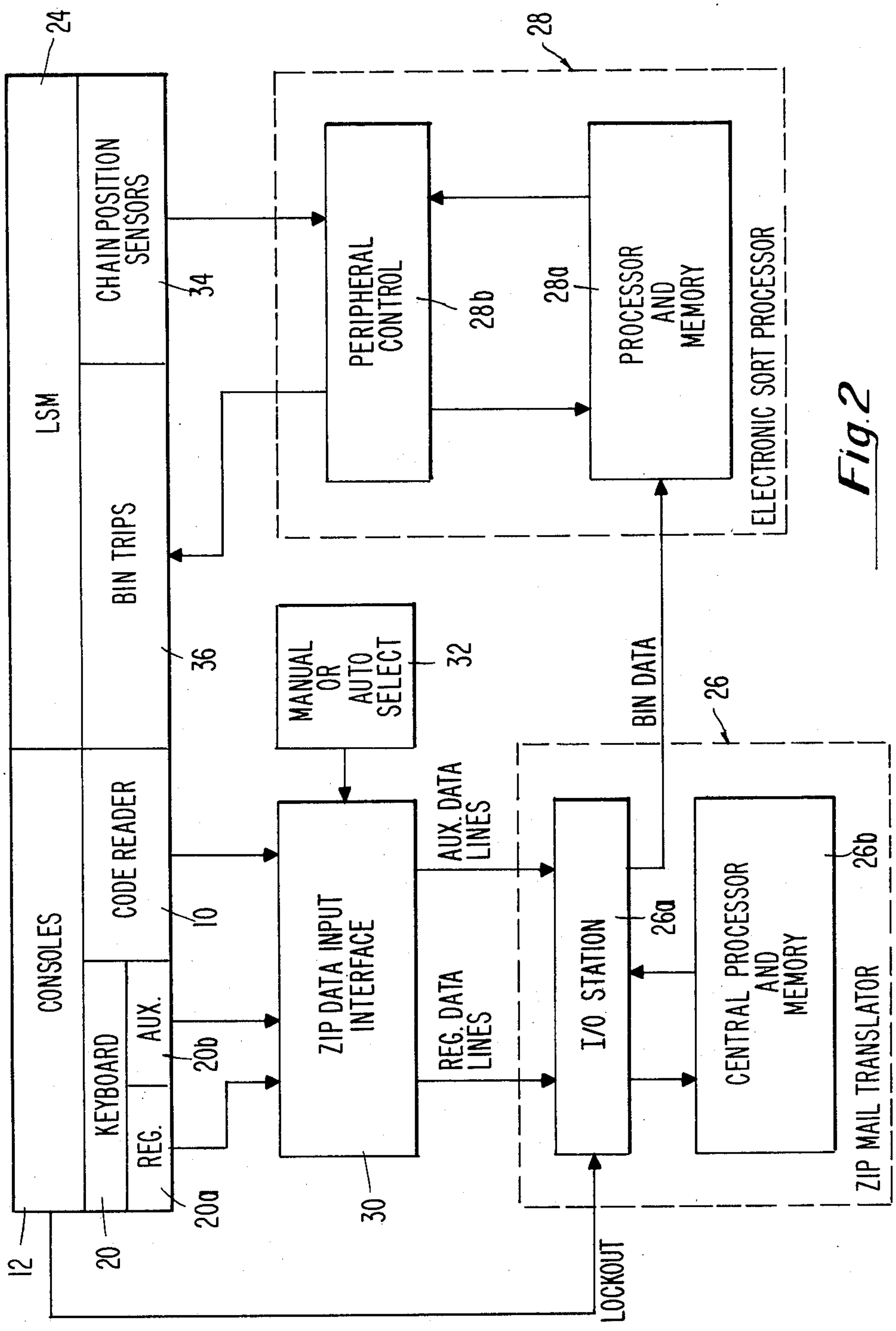
FIG. 2 is a block diagram of the principal portions of a letter sorting machine adapted in accordance with the present invention to accept address data from the optical reader station as well as keyboard initiated data.

In FIG. 2, there is illustrated in simplified form the block diagram of a letter sorting machine 24 capable of accepting both manual keyboard and code controlled data, the latter being provided by the optical reader kit of the present invention.

The existing LSM 24 and its accompanying input consoles 12 include a ZIP Mail Translator (SMT) 26 comprising an I/O station 26*a* and a Central Processor/Memory 26*b*. The ZMT 26 operates in conjunction with an Electronic Sort Processor 28 which comprises a Processor/Memory 28*a* and Peripheral Control 28*b*, to automatically direct mail to its proper bin destination. Destination data for each mail piece is presently supplied to the ZMT 26 from the regular or auxiliary sections of the console keyboard 20. In accordance with the invention, an optical code reader 10 as illustrated in FIG. 1, is added to the console 12 and a ZIP Data Input Interface 30 is interposed between the console 12 and the I/O Station 26*a* of the ZMT 26. The interface 30 will accept either manual keyboard data or code reader data, and in either case, outputs data in the format utilized by the manual keyboard 20. A Manual or Auto Select 32 is coupled to the ZIP Data Input Interface 30 and regardless of which operation is chosen, no modification of the ZMT 26 is required. Functionally the ZMT 26 accepts ZIP code data and translates it into a bin designation which it supplies to the Processor/Memory 28*a* of the Electronic Sort Processor 28 via the ZMT I/O Station 26*a*. The latter Processor 28, via its Peripheral Control 28*b*, makes use of Chain Position Sensors 34 in the LSM 24 to electronically track the mail carts used in the system, and actuates the Bin Trip devices 36 to release a mail piece, when it arrives at the proper sort bin.

With continued reference to FIG. 2, it is believed helpful to review the nature of the input data supplied to the ZMT 26 from the keyboard 20 and the code reader 10. The ZIP Data Input Interface 30 is described in detail hereinafter in connection with FIGS. 3 and 4. The LSM console 12 employs a keyboard which consists of a regular section 20*a* and an auxiliary section 20*b*, each of which contains ten keys. Basic sorting schemes use the regular keyboard 20*a* to key two or three digits of the ZIP code. The ZMT 26 is limited to a maximum of three digit inputs. Three digit keying is usually used for sorting outgoing mail where the first three digits are keyed. Two digit keying is used for sorting incoming mail where the last two digits are keyed. More complex schemes utilize the auxiliary keyboard 20*b* for special situations. For example, each auxiliary key may be assigned a three digit code usually representing the suburban stations around a major city and one key is reserved for the city itself. The three digits are taken from the first three of the ZIP code for these suburban stations and the city. As a result, when sorting collection mail, that is, mail not yet divided into that which is incoming and outgoing, a single auxiliary key can be used to input three digits of a code and the regular keyboard used to input the other two digits. In this way, a five digit code can be inputted to the ZMT with three key strikes. This allows the collection mail to be sorted, such that mail remaining in the city may be sorted down to the appropriate zone, suburban mail can be sorted to zones, and outgoing mail sorted normally, all within the limits of the ten auxiliary key assignments and the capacity of the sorting machine. Other special combinations of auxiliary and regular keying are also utilized. It can be appreciated that each major post office utilizing these special schemes requires unique assignment of the auxiliary keys.

In terms of the Code Reader 10, it may be assumed for purpose of example, that a bar code is employed, such that the ZIP code field of the bar code pattern is made up of 20 bits. Ten bits contain the three decimal U.S. Postal Service Sectional Center Facility, expressed as a binary number. Eight other bits contain the two decimal zone portion of the ZIP code, also expressed as a binary number. The remaining bits are used for parity and framing checks.

Figure 3:
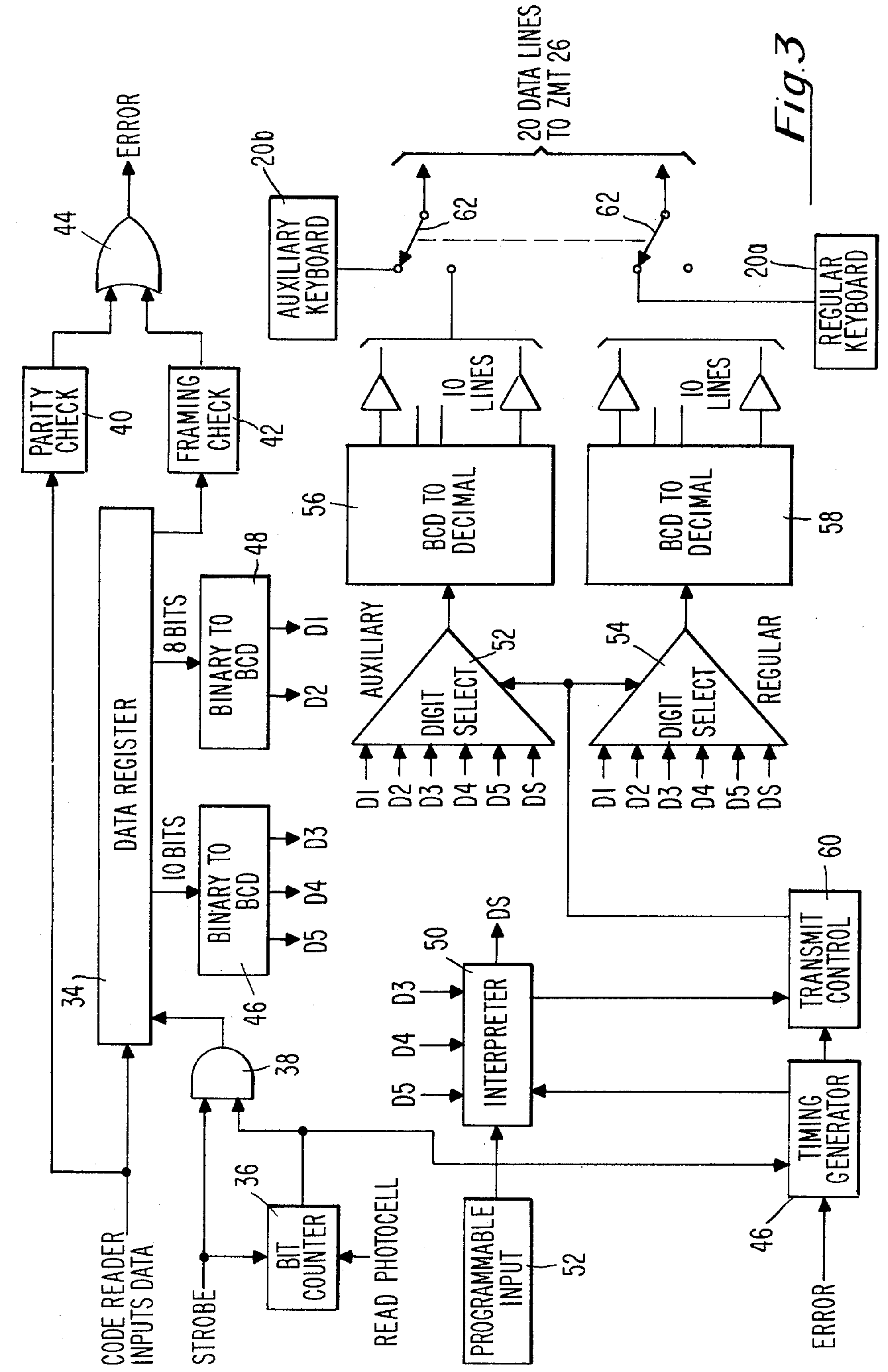
FIG. 3 is a block diagram of the modifications shown generally in FIG. 2, particularly the "ZIP Date Input Interface".

The elements comprising the ZIP Data Input Interface 30 of FIG. 2 are shown in greater detail in FIG. 3. The Code Reader inputs or data for the Interface 30 are strobed into a twenty bit data register 34. A bit counter 36 in conjunction with a read start photocell controls the loading of the data register 34 via an AND gate 38. After the 20 bit data word has been acquired, the logic circuits of the parity check 40 and framing check 42, utilizing two of the data bits, examine the input data. If an error in the latter is detected by either check, an error signal is applied via OR gate 44 to the timing generator 46 and no transmission of data to the ZIP Mail Translator (ZMT) 26 (FIG. 2) will take place. If however, the checks are valid, the first ten bits stored in the data register 34 are applied to a binary-to-binary coded decimal (BCD) converter 46, while the next succeeding eight bits of the register 34 are applied to another binary-to-BCD converter 48. The output digits of the binary-to-BCD-converter 46, designated respectively D5, D4 and D3 represent the first three digits of the ZIP code as read by the code reader 10. The last mentioned digits are applied to the interpreter 50. As will be described in detail in connection with FIG. 4, the logic of the interpreter 50 operates upon three digits and the numerical content thereof determines which digits, and over which set of data lines, that is, Regular or Auxiliary, the data will be transmitted to the ZMT 26. It is also possible for the interpreter 50 to transmit a special digit, DS, other than one of those contained within the ZIP code data. Utilizing the programmable input unit 52, the interpreter 50 may be programmed to reflect the scheme requirements of the ZMT 26.

In order to emulate the manual keyboard inputs to the ZMT 26 from the regular keyboard 20*a* and the auxiliary keyboard 20*b*, the entire ZIP code is converted to five BCD digits, designated respectively D5, D4, D3, D2 and D1. D2 and D1 are derived from the 8 bit binary input to the binary-to-BCD converter 48. The five BCD digits, along with the special digit, DS, from the interpreter 50 are applied to a pair of digit selectors, 52 and 54, which are designated respectively as being auxiliary and regular. The data outputs from the selectors 52 and 54 in BCD form are applied respectively to a pair of BCD-to-decimal converters 56 and 58, each of which includes 10 output lines for transmitting the mail destination data to the ZMT 26. The transmission of the data is controlled by the timing generator 46, the transmit control unit 60, and the logic within interpreter 50. Switching means 62 which may be mechanical or electronic are provided for switching from the "auto read" to the "manual keyboard" mode. In either case, twenty data lines output the desired information to the ZMT 26.

Figure 4:
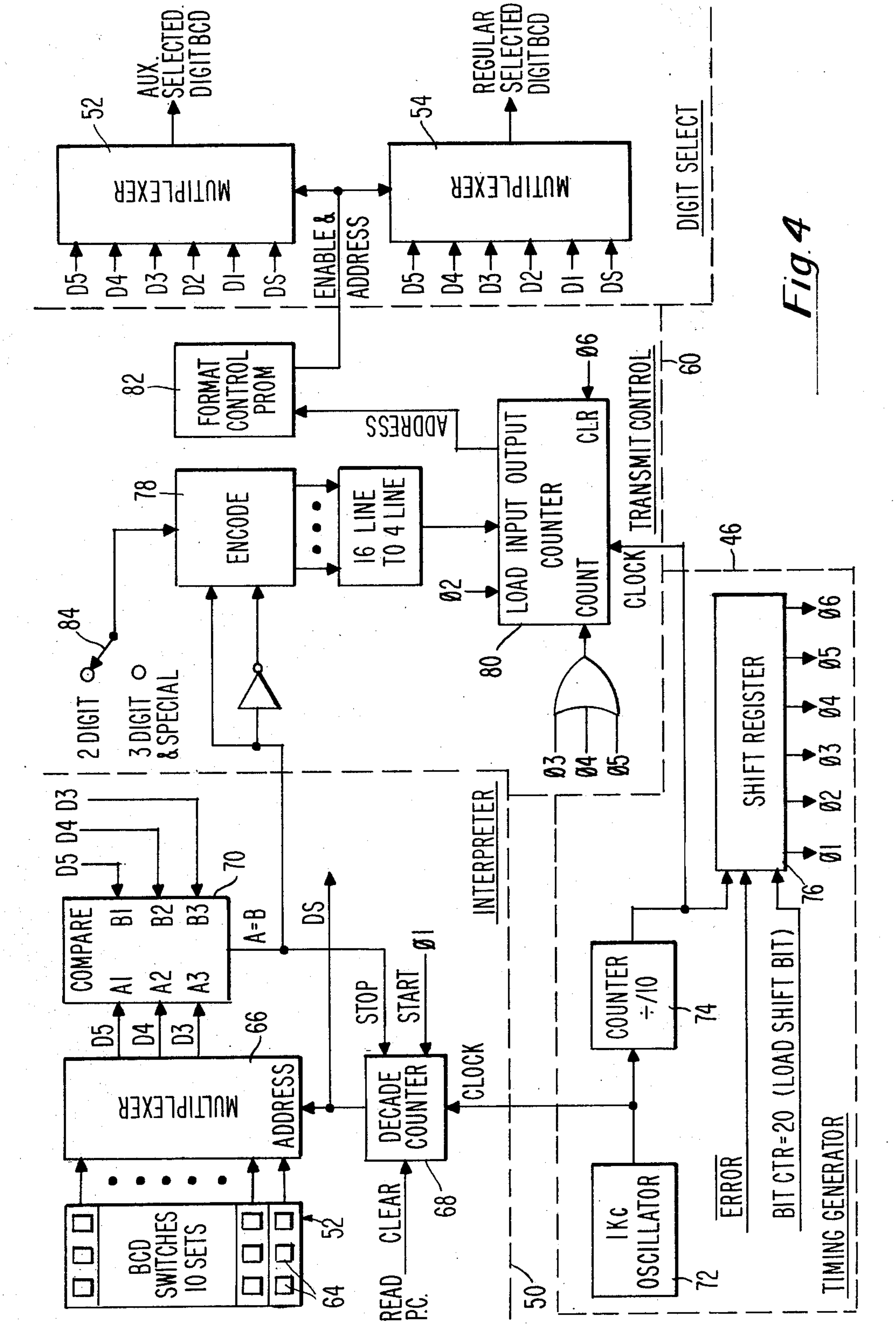
FIG. 4 is an expanded block diagram based upon FIG. 3 and providing more details of the "Interpreter", "Timing Generator" and "Transmit Control" illustrated in the latter.

FIG. 4 provides more detailed information on the interpreter 50, transmit control 60 and timing generator 46 shown in FIG. 3. As mentioned in connection with the latter Figure, the purpose of the interpreter logic is to examine the first three digits of the ZIP code as read by the optical reader 10. In this examination, the interpreter 50 will determine whether the three digits match any of the auxiliary key assignments and if so, which key matches. The interpreter then supplies the proper information to the transmit control 60 which submits the code to the ZMT 26 in the proper format.

With general reference to FIG. 3, and specific reference to FIG. 4, the interpreter 50 is programmed by a programmable input unit 52 comprised of a set of BCD switches 64. For example, the latter may be of the thumbwheel type or dual-in-line printed circuit mounted digital switches. In either case, a switch 64 is required for each decimal digit. Thirty switches would be needed for a ten key capability, arranged in groups of three. The output switch signals from the programmable input unit 52 are applied to a multiplexer 66 which is addressed by a decode counter 68, which receives a clear signal input from the read photocell. The output of the multiplexer 66 is one of a group of three digits. The latter are applied to a comparator 70, which compares them to the digits D5, D4 and D3 read by the code reader 10. The decode counter 68 addresses each set of switches 64 and is stepped by clock and $\phi 1$ enable pulses supplied from the timing generator 46. If a match is found by the comparator 70, it applies to stop pulse to the counter 68. The BCD switches 64 are connected to the multiplexer 66 in such a way that the address into the multiplexer at the time of a match, represents the decimal number of the auxiliary keyboard 20*b* key assigned to the code producing the match. Therefore the address becomes the special digit, DS.

The counter 68 is controlled by signals from the timing generator 46. The timing generator 46 is comprised of an oscillator 72, for example of 1 KHz frequency, a divide-by-ten counter 74, which then produces a 100 Hz signal, and a sequence signal shift register 76. In this way two unconditional clocks are generated at respective frequencies of 1 KHz and 100 Hz. When the reader bit counter 36 (FIG. 3) reaches a count of twenty and no parity or framing error exists, the sequence shift register 76 is loaded and a series of sequenced signals $\phi 1$ through $\phi 6$ are generated thereby. During sequence $\phi 1$, the interpreter multiplexer counter 68 counts, and scans the switch inputs for a match. Sequence signals $\phi 2$ through $\phi 6$ are used by the logic circuits of the transmit control 60.

The transmit control 60 is made up of an encoder 78, a counter 80, and a format control programmable read-only memory (PROM) 82. A ROM may be substituted for the latter in certain applications. The encoder 78 receives signals from the keying mode switch 84, and the interpreter comparator 70. In effect, the encoder 78 is comprised of combinational logic and provides a 16 line to 4 line encode function. The combinational logic examines the comparator output and the keying switch mode, that is "2 digit" or "three digit and special", and selects one of 16 lines into the final encoder. For example, if $A=B$ in the comparator 70 and the keying switch 84 is in the three digit mode, line 1 could be selected. This would result in a BCD code being loaded into the transmit control counter 80 by the $\phi 2$ pulse. The BCD code specifies the starting address of the count, and since the output of the counter 80 addresses the PROM 82, it selects the start point for the format required. Other combinations like $A \neq B$ and a three digit mode result in a different start point for the PROM, and therefore, a different transmit format. The counter 60 is stepped through three addresses by signals $\phi 3$, $\phi 4$ and $\phi 5$ applied thereto. The output of PROM 82 addresses the digit select units 52 and 54, each of which functions as a multiplexer, and select a BCD digit for transmission over regular or auxiliary key lines. The $\phi 6$ signal from the shift sequencer 76 clears the counter 80 and terminates the transmit sequence.

In conclusion, there has been described a code reader kit which has particular application in the retrofit of existing letter sorting machines. The ability of such machines to selectively operate in a manual mode, as at present, or in an automatic mode, as provided by the present invention, greatly increases the performance and usefulness of such machines. While there have been disclosed specific design details applicable to a particular machine, the basic principles taught herein may be applied to other similar machines which nevertheless differ somewhat in construction or operation. Changes and modifications of the kit may be required to suit particular requirements. Such variations as are within the skill of the designer, and which do not depart from the true scope and spirit of the invention are intended to be covered by the following claims.

What is claimed is:

1. A code reader kit for use with a letter sorting machine having an input console which includes an operator-controlled keyboard for the entry of destination data for each mail piece and a ZIP mail translator (ZMT) for converting such data into a sort bin designation, comprising in combination:

a code reader operatively mounted on said console for reading pre-coded address information on each said mail piece, a ZIP data input interface coupled between said code reader and said ZMT, said ZIP data input interface including a data register coupled to said code reader for storing in binary form said address information, binary-to-BCD converter means coupled to said data register for converting said address data to a BCD format, interpreter means, programmable input means coupled to said interpreter means and adpated to be operator programmed with a plurality of predetermined first sequences of digits representative of key assignments on said keyboard, means for coupling a second predetermined sequence of digits from the output of said binary-to-BCD converter means into said interpreter means, said interpreter means comparing said second sequence of digits with said first sequences of digits and providing output signals indicative of the comparisons, transmit control means including an encoder and memory means for storing predetermined data transmission formats, an operator-selectable digit mode means providing an output signal indicative of the fixed number of digits selected, means for applying the respective outputs of said interpreter and said digit mode means concurrently to said encoder of said transmit control means, means coupling the output of said encoder to said memory means, said last mentioned output providing an address in said memory means and one of said transmission formats, a pair of digit select means, means for coupling all of said address data from said binary-to-BCD converter means to each of said pair of digit select means, means coupling an address and enable signal from said memory means to both said digit select means for selecting a digit to be transmitted to said ZMT, and a pair of BCD-to-decimal converter means coupled respectively to said digit select means for converting said last mentioned digit to decimal form prior to its transmission to said ZMT.

2. A code reader kit as defined in claim 1 further characterized in that said programmable input means of said ZIP data input interface comprises a set of BCD switches, each switch representing a decimal digit, said BCD switches providing output signals indicative of the switch settings.

3. A code reader kit as defined in claim 2 wherein said interpreter means includes a multiplexer, a decade counter and a comparator, said multiplexer being coupled to said set of BCD switches for receiving the output signals therefrom, said multiplexer being further coupled to said decade counter and being sequentially addressed thereby such that multiplexer signals are generated corresponding to said plurality of predetermined first sequences of digits, said comparator means being coupled to both said multiplexer and said binary-to-BCD converter means whereby said plurality of first sequences of digits are compared to said second sequence of digits derived from said last mentioned converter means, means connecting said comparator to said decade counter for terminating the sequential addressing of said multiplexer in response to the occurrence of a match in first and second sequence digits, the address into said multiplexer at the time of said match being representative of the decimal number of the key on said keyboard assigned to the code producing the match, said multiplexer generating a special output digit indicative of the last mentioned address.

4. A code reader kit as defined in claim 3 further including a timing generator comprised of an oscillator of preselected frequency, a division counter arranged to divide said frequency and a sequence signal shift register, the output of said oscillator being coupled to said decade counter of said interpreter and providing therefor a first clock, said oscillator being further coupled to said division counter which in turn is coupled to said shift register, said shift register providing a sequential plurality of outputs at a second clock generated by said division counter.

5. A code reader kit as defined in claim 4 further characterized in that said means coupling the output of said encoder to said memory means in said transmit control means includes a control counter, the output of said encoder being applied to said control counter for enabling a predetermined BCD code to be loaded thereinto, said BCD code specifying the starting address of the count, the output of said control counter being coupled to said memory means and providing an address therefor which serves as the starting point for the destination format required.

6. A code reader kit as defined in claim 5 wherein said pair of digit select means are a respective pair of multiplexers.

7. A code reader kit as defined in claim 6 wherein said data register is capable of storing 20 bits and said binary-to-BCD converter means comprise a pair of binary-to-BCD converters, a first converter of which provides as an output the first three digits of the ZIP code read by said code reader, said first three digits corresponding to said second sequece of digits applied to said comparator in said interpreter, and a second converter of which, provides as an output, the last two digits of said ZIP code.

8. A code reader kit as defined in claim 7 wherein two of the bits stored in said data register are utilized respectively for a parity and a framing check.

9. A code reader kit as defined in claim 8 further including switching means for selectively placing said console in a manual keyboard mode or an automatic code reader mode.

10. A code reader kit as defined in claim 9 wherein said keyboard of said input console is comprised of a regular section and an auxiliary section, the pair of digit select multiplexers being associated respectively with the last mentioned sections.

* * * * *